United States Patent [19]

Nelle

[11] 4,070,759
[45] Jan. 31, 1978

[54] SEALED INCREMENTAL MEASURING DEVICE HAVING AN ARTICULATED FASTENING MEANS FOR MOUNTING THE HOUSING

[75] Inventor: Günther Nelle, Siegsdorf, Germany

[73] Assignee: Dr. Johannes Heidenhain GmbH, Traunreut, Germany

[21] Appl. No.: 656,745

[22] Filed: Feb. 9, 1976

[30] Foreign Application Priority Data

Feb. 11, 1975   Germany .............................. 2505585

[51] Int. Cl.² ............................................ G01B 11/04
[52] U.S. Cl. .................................. 33/125 C; 356/169
[58] Field of Search ................. 248/DIG. 9, 300, 459, 248/174; 250/237 G; 356/169, 170; 33/125 R, 125 C, 125 A, 1 L

[56] References Cited

U.S. PATENT DOCUMENTS

| | | | |
|---|---|---|---|
| 2,459,692 | 1/1949 | Fletcher | 248/300 |
| 2,875,805 | 3/1959 | Flora | 248/300 |
| 3,352,466 | 10/1967 | McAllister | 33/107 R |
| 3,464,569 | 9/1969 | Danning | 248/174 |
| 3,536,287 | 10/1970 | Kramer | 248/DIG. 9 |
| 3,815,125 | 6/1974 | May et al. | 250/237 G |
| 3,816,002 | 6/1974 | Wieg | 33/125 C |
| 3,816,003 | 6/1974 | Litke | 33/125 C |
| 3,952,980 | 4/1976 | Pragenan et al. | 248/22 |

Primary Examiner—Richard E. Aegerter
Assistant Examiner—John W. Shepperd
Attorney, Agent, or Firm—Hume, Clement, Brinks, Willian & Olds, Ltd.

[57] ABSTRACT

A photoelectric incremental longitudinal measuring instrument is disclosed in which a measuring graduation and a displaceable photoelectric sensor housing unit are enclosed in an elongated hollow body resistant to bending to screen the measuring graduation and the sensor unit from environmental influences. The hollow body is fastened to one of the two objects to be measured with the instrument by fastening means having an articulated design, preferably, a pair of legs formed at an angle to one another having a weak place in the form of a groove in the apex area of the legs. Such an articulated design virtually eliminates the presence of compulsive forces between the hollow body and the object to which it is attached via the fastening means.

12 Claims, 4 Drawing Figures

SEALED INCREMENTAL MEASURING DEVICE HAVING AN ARTICULATED FASTENING MEANS FOR MOUNTING THE HOUSING

The invention relates to a measuring installation for length measurements in order to measure or adjust the relative position of two objects, whose measuring graduation and the displaceable sensor housing unit associated with it are embedded in an elongated hollow body which is resistant to bending for screening against environmental influences.

The invention is based on the problem which exists in an encapsulated installation for longitudinal measurements of the above mentioned kind of providing a fastening means between the hollow body which is resistant to bending and one of the objects to be measured which exerts practically no compulsive forces on the hollow body. Moreover, the fastening means for the hollow body should be easy to manufacture and permit a rapid mounting of the hollow body for example at a processing or a measuring machine.

This problem is solved in a longitudinal measuring installation for measuring or adjusting the relative position of two objectives according to the invention in that the hollow body is fastened to one of the aforementioned objects which is being measured via a fastening means having an articulated design which fastening means extends beyond the hollow body so that the hollow body itself is free from direct contact with and is not supported by the object to which it is fastened via the fastening means.

In an advantageous embodiment, a fastening free from compulsive forces between the hollow body and the object (for example a machine bed) is accomplished by the interposition of angle parts having a weak place in the form of a groove in the apex area of the legs.

Additional features and advantages of this invention are described in, and will appear from, the description of the preferred embodiment which follows and from the drawing which represents an embodiment of the invention and to which reference is now made.

The embodiment illustrated shows a photoelectric incremental longitudinal measuring system for the measuring or adjusting of the relative position of two objects, for example, the bed and the carriage of a processing or measuring machine.

Figure 4:
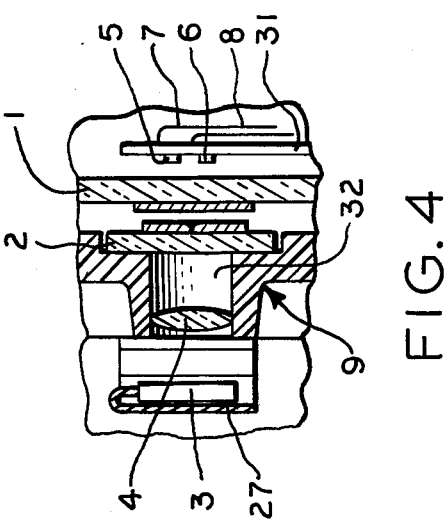
FIG. 4 shows a section taken along line 4—4 in FIG. 2 through the photoelectric sensor housing unit of the longitudinal measuring instrument of the invention.

The measuring graduation 1 which is a transmission grid and the sensor plate 2 (FIG. 4) are illuminated by way of a light 3 via a lens 4. The light passing through the grids 1, 2 is projected upon photo elements 5, 6 whose electric output signal is fed via the outlets 7, 8 directly to an electronic up and down count meter of a known type (not shown).

The measuring graduation 1 and the sensor housing unit 9 associated with it are placed for screening against environmental influences in a hollow body 10 resistant to bending which appropriately is made from extruded aluminum. The measuring gradution 1, which is a glass body, is fastened to the metallic hollow body 10, without directly contacting it, with the interposition of a highly elastic layer 11, preferably a silicon rubber adhesive layer. This type of fastening for the measuring graduation 1 offers the advantage that unevennesses in the heat expansion of measuring graduation 1 and the hollow body 10 will practically cause no adulteration of the readings.

The sensor housing unit 9 is guided in the embodiment via sliding shoes 12, 13, preferably made from plastic, directly at the measuring graduation 1 and via ball bearings 14, 15 at the hollow body 10. The guiding of the sensor housing unit 9 at the measuring graduation 1 and at the hollow body 10 makes possible a small compact design assuring a trouble-free scanning and easy manufacturing from a production-engineering point of view. The sensor unit 9 which appropriately is produced as a plastic injection molding part is urged with the aid of a spring wire 16 against the guiding surfaces at the measuring graduation 1 and at the hollow body 10. At the same time, the wire 16, which is resistant to bending in the direction of displacement of the housing unit 9, represents the coupling part between the sensor housing unit 9 and an entrainment means 17.

Figure 3:
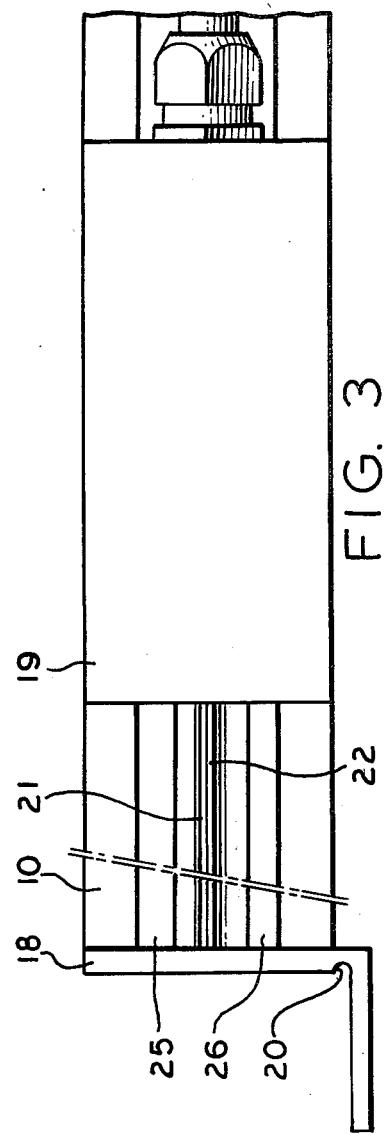
FIG. 3 shows a side view of the longitudinal measuring instrument.
Figure 1:
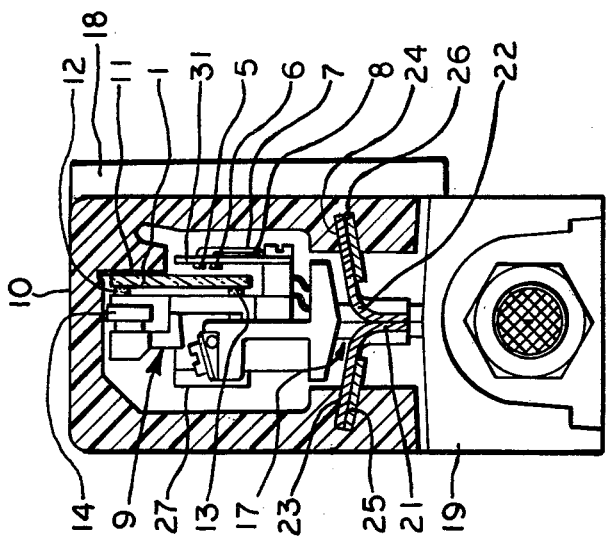
FIG. 1 shows a section taken along line 1—1 in FIG. 2 through a longitudinal measuring instrument according to the invention.

According to the invention, the hollow body 10 is fastened at one of the objectives, whose relative position is to be measured, via two fastening members 18 provided at its ends and designed in an articulated manner. For the sake of simplicity, the drawing only shows one of the articulated parts 18. An attachment means 19 is fastened to the second object and is connected to the sensor unit 9 by an entrainment means 17. The two fastening members 18 fastened to the frontal side of the hollow body 10 are angled parts in the embodiment having a weak place in the shape of a groove 20. In the embodiment illustrated, the portion of the angled part 18 fastened directly to hollow body 10 extends below the bottom of hollow body 10 (see FIG. 3) so that the hollow body is maintained away from any direct contact with the object to which the other portion of angled part is fastened. By fastening the hollow body 10 via two fastening members 18 having an articulated design, practically no compulsive forces are exerted upon the hollow body 10 during the assembly and the use of the measuring system, which means that the hollow body 10 and the measuring graduation 1 fastened therein will not be deformed.

One side of the hollow body 10 is sealed by flexible sealing lips 21, 22 designed in a roof-like manner, the slender entrainment means 17 of sword-like design extending therethrough. The sealing lips 21, 22 are fastened in slots 23, 24 of the hollow body 10 at sheet metal strips 25, 26. The legs of the U-shaped hollow body 10 extend far enough so that they slightly protrude beyond the roof-shaped sealing lips 21, 22, and offer protection to the sealing lips 21, 22 against meachnical damages.

Figure 2:
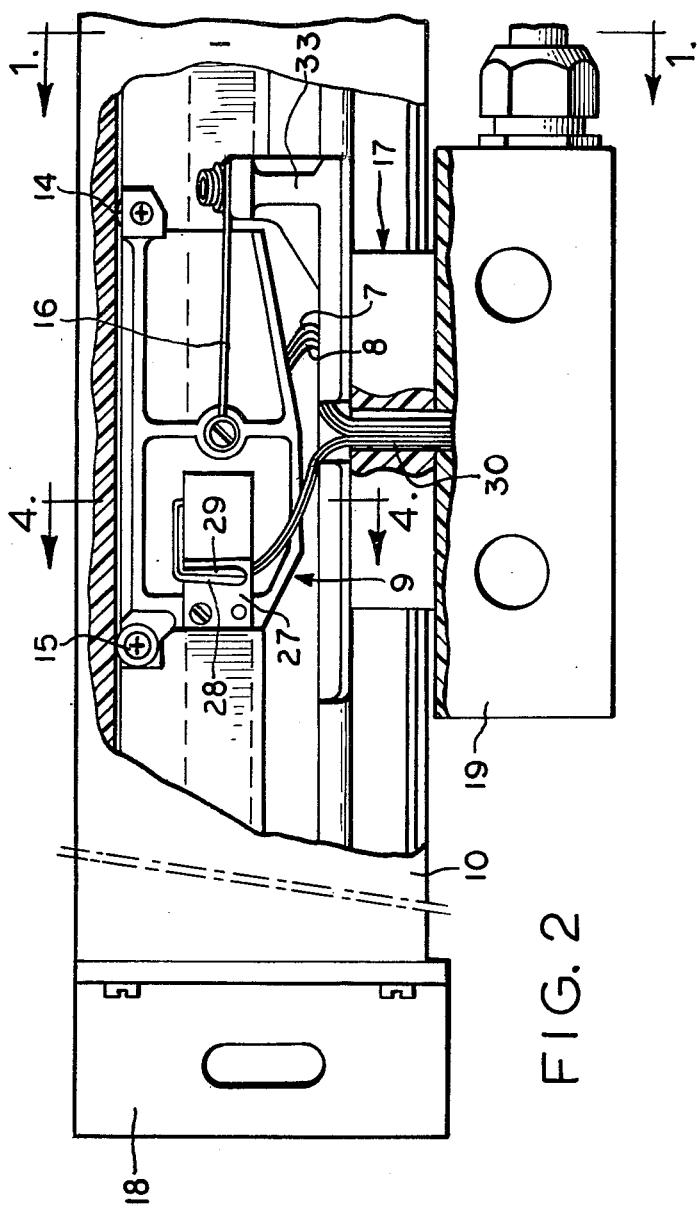
FIG. 2 shows a top view of the longitudinal measuring instrument.

The light 3 is fastened via a support 27 to the displaceable scanning or sensor unit 9. The electrical conduits 28, 29 (FIG. 2) for the light 3 and the electric conduits 7, 8 of the photo elements 5, 6 extend out of the hollow body 10 through an opening 30 in the entrainment means 17. The photo elements 5, 6 are located in a support 31 fastened to the sensor unit 9. The capacitor 4 and the sensor plate 2 are fastened in a recess 32 in the sensor unit 9. The spring wire 16 representing the coupling and pressing member is fastened to the sensor unit 9 and to an assembly 33 formed on the entrainment means 17.

The embodiment described herein is intended to be exemplary of the types of incremental length measuring instruments and articulated fastening means for fastening one of the objects to be measured to the instrument which fall within the scope of the invention. However, one skilled in the art would certainly be expected to be able to make modifications and variations of this embodiment without departing from the spirit and scope of the invention as defined in the following claims.

What is claimed is:

1. An instrument for measuring or adjusting the relative positions of two objects, comprising:
 a measuring graduation;
 a movable housing unit having a sensor system;
 an elongated hollow body, having a longitudinally extending base, which is resistant to bending and encloses the sensor housing unit and the measuring graduation;
 means for attaching the measuring graduation to the hollow body;
 means for movably mounting the sensor housing unit within the hollow body;
 fastening means, located at the longitudinal ends of the hollow body, for fastening the hollow body to one of the objects to be measured, each of said fastening means including a pair of legs formed at an angle to one another having an articulated design, one of said legs extending below the base of the hollow body to support the hollow body away from the object to which the fastening means is attached; and
 means for connecting the sensor having unit to the other object to be measured.

2. The instrument of claim 1, wherein the pairs of legs have a weak place in the form of a groove where the legs join each other, one leg being adapted for attachment to the object to be measured and the other leg being fastened to the hollow body.

3. The instrument of claim 2, wherein the fastening means form a hermetic seal at the ends of the hollow body.

4. The instrument of claim 1, wherein the pairs of legs have a weak place in the form of a groove where the legs join each other.

5. The measuring instrument of claim 1 wherein one of said legs in each pair forms one of the ends of the hollow body and the other of said legs in each pair is adapted for attachment to the object to which the hollow body is fastened.

6. An instrument for measuring or adjusting the relative positions of two objects, comprising;
 a longitudinally extending measuring graduation;
 a movable housing unit having a sensor system;
 a longitudinally extending hollow body which is resistant to bending and encloses the sensor housing unit and the measuring graduation;
 means for attaching the measuring graduation to the hollow body;
 means for movably mounting the sensor housing unit within the hollow body;
 fastening means, located at the longitudinal ends of the hollow body, for fastening the hollow body to one of the objects to be measured, each of said fastening means including a pair of legs, formed generally perpendicular to one another, having an articulated design, one of said legs extending perpendicular to the longitudinal dimension of the hollow body and extending below the base of the hollow body to support the hollow body away from the object to which the fastening means is attached, the other of said legs extending parallel to the longitudinal dimension of the hollow body; and
 a connecting member extending through a side of the hollow body for connecting the sensor unit to the other object to be measured.

7. The instrument of claim 6, wherein the pairs of legs have a weak place in the form of a groove where the legs join each other.

8. The instrument of claim 6, wherein each pair of legs has a weak place in the form of a groove in the apex area of the legs, the legs extending below the base are fastened to the hollow body and the legs extending parallel to the longitudinal dimension of the hollow body are adapted for fastening to the object.

9. The measuring instrument of claim 6 wherein one of said legs in each pair forms one of the ends of the hollow body and the other of said legs in each pair is adapted for attachment to the object to which the hollow body is fastened.

10. In a measuring instrument for measuring or adjusting the relative positions of two objects, including a measuring graduation, a movably mounted sensor housing unit incorporating a sensor system and an elongated hollow body which is resistant to bending and encloses the measuring graduation and the movably mounted sensor housing unit to protect them from environmental influences, in which the hollow body is fastened to one of the objects to be measured with fastening members located at its longitudinal ends and the sensor housing is provided with a coupling means which extends through an opening in the hollow body and is fastened to the other object, the improvement comprising said hollow body fastening members both having a pair of legs, including a first leg protruding below the hollow body and a second leg extending generally perpendicular to the first leg, having a weak place in the form of a groove in their apex area, said fastening members supporting the hollow body away from direct contact with the object to which the hollow body is fastened by said fastening members.

11. The instrument of claim 10, wherein the first legs are mounted on the longitudinal ends of the hollow body and the second legs are adapted for fastening to the object.

12. The measuring instrument of claim 10, wherein the fastening members form a hermetic seal at each end of the hollow body.

* * * * *

UNITED STATES PATENT AND TRADEMARK OFFICE
CERTIFICATE OF CORRECTION

PATENT NO. : 4,070,759
DATED : January 31, 1978
INVENTOR(S) : Gunther Nelle

It is certified that error appears in the above–identified patent and that said Letters Patent are hereby corrected as shown below:

Claim 1, line 22, "having" should read -- housing --.

Signed and Sealed this

Sixth Day of June 1978

[SEAL]

Attest:

RUTH C. MASON
Attesting Officer

DONALD W. BANNER
Commissioner of Patents and Trademarks